United States Patent
Yu et al.

(10) Patent No.: US 10,958,306 B2
(45) Date of Patent: Mar. 23, 2021

(54) APPARATUS AND METHOD FOR MANAGING ULTRA WIDEBAND (UWB) OCCUPIED BANDWIDTHS

(71) Applicant: Apple Inc., Cupertino, CA (US)

(72) Inventors: Xiaoming Yu, Cupertino, CA (US); Alejandro J. Marquez, Sunnyvale, CA (US); Lei Li, Sunnyvale, CA (US); Peter M. Agboh, Burlingame, CA (US); Shang-Te Yang, San Jose, CA (US); Vusthla Sunil Reddy, Cupertino, CA (US); Pradeep K. Marri, Campbell, CA (US); Manjit S. Walia, San Jose, CA (US); Ali Pourghorban Saghati, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/818,191

(22) Filed: Mar. 13, 2020

(65) Prior Publication Data

US 2020/0382159 A1     Dec. 3, 2020

Related U.S. Application Data

(60) Provisional application No. 62/855,535, filed on May 31, 2019.

(51) Int. Cl.
| | | |
|---|---|---|
| *H04B 1/7176* | (2011.01) | |
| *H04B 1/7163* | (2011.01) | |
| *H04B 1/717* | (2011.01) | |

(52) U.S. Cl.
CPC ........ *H04B 1/71635* (2013.01); *H04B 1/717* (2013.01); *H04B 1/7176* (2013.01)

(58) Field of Classification Search
CPC .. H04B 1/717; H04B 1/71635; H04B 1/7176; H04L 25/03834; H04L 25/03828; H04W 52/0245
See application file for complete search history.

(56) References Cited

U.S. PATENT DOCUMENTS

| | | | | |
|---|---|---|---|---|
| 7,236,747 B1 * | 6/2007 | Meacham | ......... | H04B 1/71632 370/208 |
| 7,505,522 B1 * | 3/2009 | Larsson | ............ | H04L 25/03828 370/350 |

(Continued)

OTHER PUBLICATIONS

Yusnita Rahayu, Tharek Abd. Rahman, Razali Ngah, P.S. Hall, "Ultra Wideband Technology and Its Applications", Universiti Teknologi Malaysia, University of Birmingham, IEEE (Year: 2008).*

*Primary Examiner* — Aristocratis Fotakis
(74) *Attorney, Agent, or Firm* — Sterne, Kessler, Goldstein & Fox P.L.L.C.

(57) ABSTRACT

Some embodiments include a system, method, and computer program product for managing the Ultra Wideband (UWB) systems, especially when the UWB system is collocated with another wireless system (e.g., WiFi) to transmit and/or receive UWB signals with an occupied bandwidth (OBW) that satisfies a UWB OBW standard (e.g., a UWB OBW>=500 MHz.) In some embodiments a TailBit signal (e.g., a periodic signal at a selected frequency) is added to a UWB packet to generate frequency components at the selected frequency that enables the power spectrum of the TailBit UWB signal to satisfy the UWB OBW standard. In some embodiments an altered code sequence is used to generate an altered spread signal, where the altered code sequence reduces or removes a frequency component peak near DC frequency of the power spectrum of an altered UWB signal, resulting in altered UWB OBW that satisfies the UWB OBW standard.

20 Claims, 11 Drawing Sheets

(56) References Cited

U.S. PATENT DOCUMENTS

| | | | |
|---|---|---|---|
| 2004/0136438 A1* | 7/2004 | Fullerton | H03C 1/02 375/130 |
| 2004/0184512 A1* | 9/2004 | Twu | H04B 1/707 375/146 |
| 2015/0103751 A1* | 4/2015 | Afkhami | H04B 3/54 370/329 |
| 2020/0067565 A1* | 2/2020 | Yu | H04B 1/71632 |

* cited by examiner

APPARATUS AND METHOD FOR MANAGING ULTRA WIDEBAND (UWB) OCCUPIED BANDWIDTHS

CROSS-REFERENCE TO RELATED APPLICATIONS

This application claims benefit of U.S. Application No. 62/855,535, filed on May 31, 2019, entitled, Apparatus and Method for Managing Ultra Wideband (UWB) Occupied Bandwidths, which is incorporated herein by reference in its entirety.

BACKGROUND

Field

The described embodiments generally relate to Ultra Wideband (UWB) communications.

Related Art

Ultra Wideband (UWB) systems utilize a wireless technology that utilizes a large bandwidth in excess of 500 MHz. Compared to narrower band radio communication technologies, UWB systems offer the following advantages: less susceptibility to multipath fading; very low (negative) signal to noise ratio (SNR); and communication security. Due to the wideband of UWB technology and low SNR, UWB signals can appear to be noise-like. Thus, UWB signals can be buried below the noise floor of receivers and are thus difficult to detect. Because they are difficult to detect, UWB signals may be less susceptible to interception or jamming compared to narrower band signals. UWB signals are subject to strict industry and regulatory standards/measurement methodologies that are defined to ensure that UWB signals maintain an occupied bandwidth (OBW) greater than or equal to 500 MHz for a system to be qualified as a UWB system.

The requirement/methodologies are the same for all UWB-rates. The OBW needs to be maintained for conducted tests as well as over-the-air (OTA) communications. Therefore, it is desirable to precisely control a front end filter and antenna of a UWB system so that the front end frequency response and/or antenna roll off does not result in an OBW smaller than 500 MHz. This is even more challenging when a UWB system shares the same antenna with another technology such as WiFi. Thus, there is a need to manage the OBW of UWB systems, especially when the UWB system is collocated with other wireless systems such as WiFi.

SUMMARY

Some embodiments include a system, method, and computer program product for managing Ultra Wideband (UWB) systems, especially when the UWB system is collocated with another wireless system (e.g., WiFi) so that UWB systems maintain at least a UWB occupied bandwidth (OBW) standard (e.g., greater than or equal to 500 MHz). In some embodiments a TailBit signal (e.g., an additional signal with a frequency component larger than 500 MHz) is added to a UWB packet to generate spikes at a selected frequency to satisfy the UWB OBW standard. A frequency component peak close to DC frequency can decrease a measurement of an OBW. In some embodiments a scramble code sequence is altered to reduce or avoid a frequency component peak close to the DC frequency, resulting in a larger OBW measurement. In some embodiments, a combination of an altered code sequence and the addition of a TailBit signal are applied to produce an altered-Tailbit UWB signal whose UWB OBW satisfies the UWB OBW standard.

Some embodiments include modulating a signal with an altered code sequence to generate an altered spread signal, where the altered code sequence satisfies a polarity ratio threshold, and creating an altered UWB packet based at least on the altered spread signal. Some embodiments include appending a TailBit signal to the altered UWB packet, where the TailBit signal is a periodic signal at a selected frequency that is greater than that of the UWB OBW standard. Based at least on the appending, some embodiments include transmitting an altered-TailBit UWB signal whose OBW satisfies the UWB OBW standard. The TailBit signal appended to the altered UWB packet produces on an altered-TailBit UWB power spectrum, frequency components at the selected frequency that are above a level that is 10 dB down from a maximum peak power measurement at DC frequency of the altered-TailBit UWB power spectrum. The TailBit signal can be a sine wave at the selected frequency. In an example, the selected frequency is 310 MHz, a power spectrum of the altered-TailBit UWB signal includes a frequency component at −310 MHz and a second frequency component at 310 MHz that are above a level that is 10 dB down from a maximum peak power measurement at DC frequency of the power spectrum of the altered-TailBit UWB signal. The TailBit signal can be appended to: a beginning of the altered UWB packet, a middle of the altered UWB packet, or an end of the altered UWB packet.

Some embodiments include determining the altered code sequence by: detecting a number of pulses, determining a polarity of the number of pulses, and comparing the determined polarity with a polarity ratio threshold. When the comparison satisfies the polarity ratio threshold, some embodiments use a predetermined set of pulses as the altered code sequence. The predetermined set of pulses may have a lower polarity compared to the polarity ratio threshold. When the comparison satisfies the polarity ratio threshold, some embodiments determine a second number of pulses to be used as the altered code sequence by: detecting a second number of pulses, determining that a second polarity of the second number of pulses does not satisfy the polarity ratio threshold, and using the second number of pulses as the altered code sequence.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
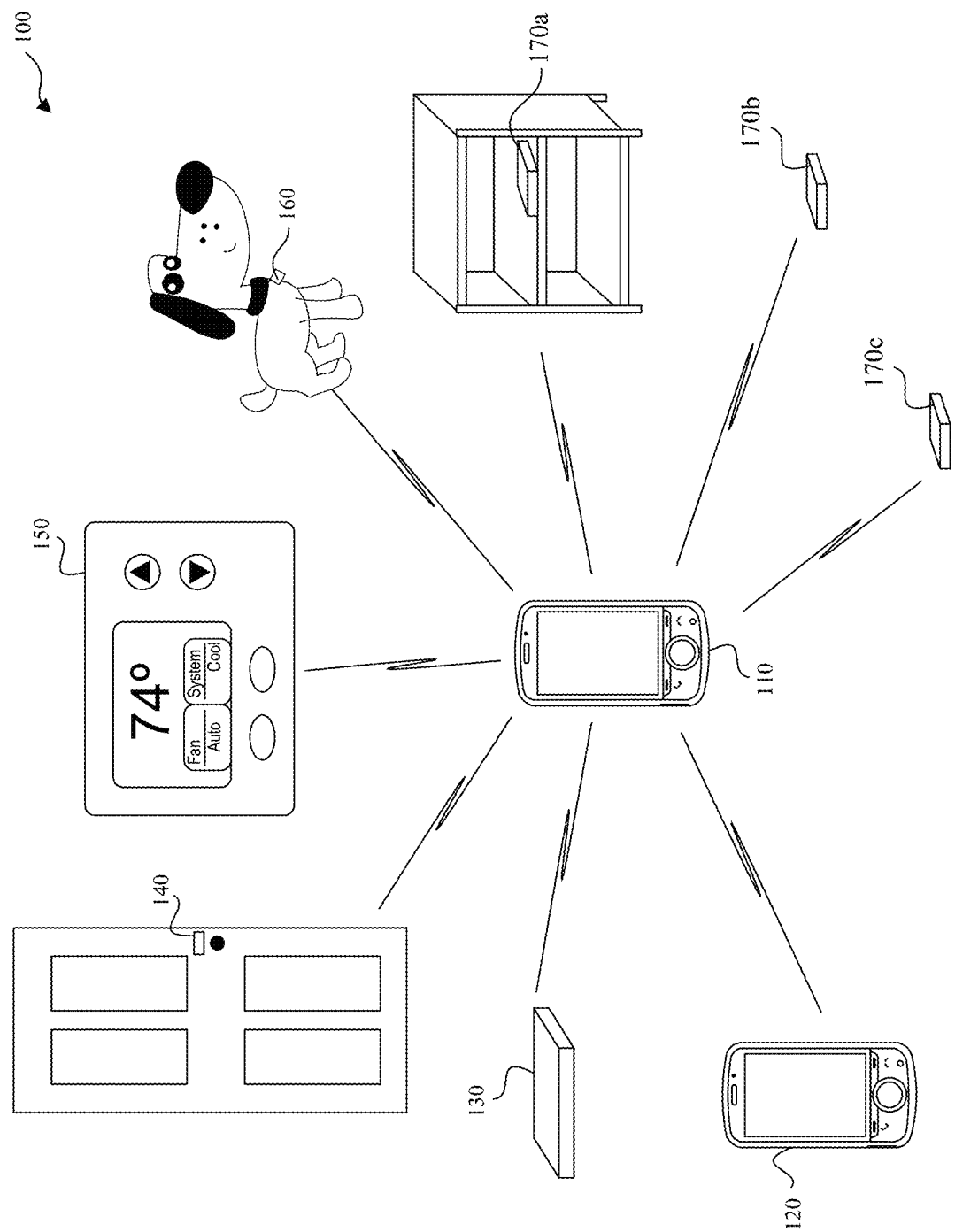
FIG. 1 illustrates an example system that manages Ultra Wideband (UWB) Occupied Bandwidths (OBWs), according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include an apparatus, method, and computer program product for managing Ultra Wideband (UWB) Occupied Bandwidths (OBWs). Industry standards and measurement methodologies require that a transmitted UWB signal has an OBW that is greater than or equal to 500 MHz to be qualified as a UWB system. The UWB standards are the same for all UWB rates. The UWB OBW standard is maintained for conducted tests as well as over-the-air (OTA) communications.

Prior to antenna transmission, a UWB signal may satisfy the UWB standard where the UWB signal has an OBW greater than the UWB standard (e.g., 500 MHz). But after the UWB signal is transmitted via the antenna, the antenna frequency roll off can reduce the OBW of the transmitted UWB signal such that the UWB standard is no longer satisfied. Similarly, on the receiving end, an incoming UWB signal may have satisfied the UWB standard (e.g, the OBW is greater than or equal to 500 MHz) prior to receiver processing, but the front end filter frequency response roll off can reduce the OBW of the received UWB signal such that the UWB standard is not satisfied. Thus, there is a need to manage the OBW of UWB systems, especially when the UWB system is collocated with other wireless systems such as WiFi.

The UWB standard determines the OBW of a UWB signal based on a maximum peak power measurement of the UWB signal at DC frequency and the intersection of the UWB signal power spectrum at a level that is 10 dB down from the maximum peak power measurement. (Herein, DC frequency of a UWB signal is substantially the center frequency of the UWB signal.) Accordingly, some embodiments minimize and/or reduce frequency components at or close to the DC frequency to enable the UWB signal's OBW to satisfy the UWB OBW standard. Some embodiments add frequency components at selected frequencies to raise the UWB signal power spectrum at the selected frequencies to exceed the 10 dB down in power from the maximum peak power level, to satisfy the UWB OBW standard. Some embodiments include a combination of reducing frequency components at or close to the DC frequency, and also add frequency components at a selected frequency to satisfy the UWB OBW standard.

FIG. 1 illustrates an example system 100 that manages UWB OBW, according to some embodiments of the disclosure. Example system 100 is provided for the purpose of illustration only and is not limiting of the disclosed embodiments. System 100 may include but is not limited to UWB devices such as wireless communication devices 110, 120, vehicular transponder device 130, entry transponder device 140, household device 150, leash tag 160, and anchor nodes 170a-170c. Other UWB devices—which are not shown in FIG. 1 for simplicity purposes—may include other computing devices including but not limited to laptops, desktops, tablets, personal assistants, routers, monitors, televisions, printers, and appliances.

The management of UWB OBW may also be used in a network topology, where more than two UWB devices perform ranging activities. Although a star topology is shown in FIG. 1, peer-to-peer topologies are also possible. For example, wireless communication device 110 may communicate with wireless communication device 120, and wireless communication device 120 may also communicate with one or more other wireless UWB communication devices (not shown).

When wireless communication device 110 is in proximity (e.g., within ten meters, within one meter, etc.) to vehicular transponder device 130 or entry transponder device 140, UWB communications may enable a corresponding car door or building entry (e.g., entry of a door to a house) to be unlocked, for example. The desired proximity can be established based on the specific application. Likewise, when wireless communication device 110 is in proximity (e.g., within fifty meters, within twenty meter, within ten meters, etc.) of household device 150, the settings of household device 150 may be adjusted to preferences associated with or stored on wireless communication device 110. In another example, leash tag 160 may be a removable device attached to a pet collar or clothing of a wandering toddler, where UWB communications between leash tag 160 and wireless communication device 110 result in an alarm notification on wireless communication device 110 when leash tag 160 exceeds a configurable distance threshold from wireless communication device 110.

The above UWB devices can be portable or mobile, and can determine relative positions and/or distances with each other. Some UWB devices may be stationary and together they may determine absolute positions or geographic locations. For example, anchor nodes 170a-170c may be transponders in fixed locations, such as on a ceiling in a building or a shelf in a store. One or more anchor nodes 170 may be used in conjunction with wireless communication device 110 to improve the accuracy and reliability of ranging activity. In some embodiments, the devices may triangulate and determine a geographic location that may be used to provide local direction information (e.g., a user may obtain directions to find a particular item in a store or supermarket that may be presented on wireless communication device 110.)

Figure 2:
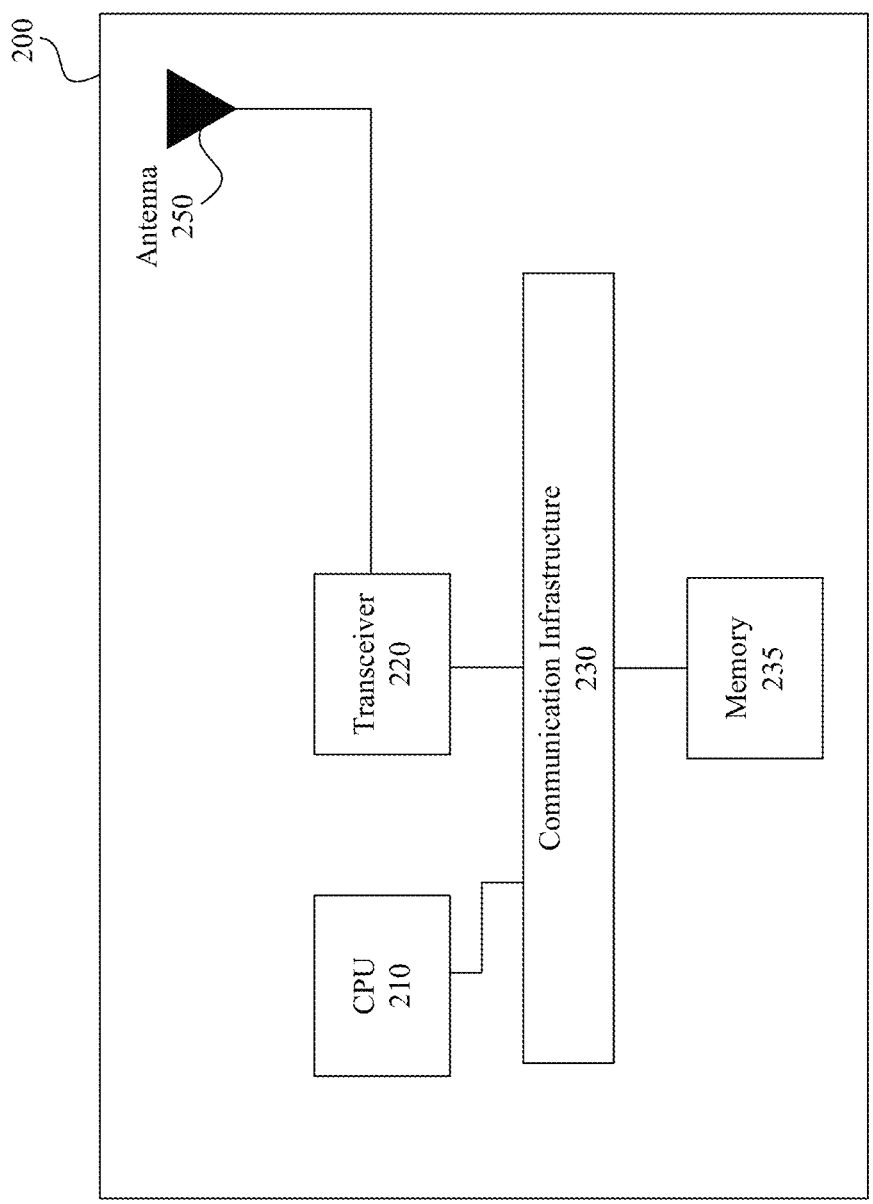
FIG. 2 illustrates a block diagram of an example wireless system that manages UWB OBW, according to some embodiments of the disclosure.

FIG. 2 illustrates a block diagram of an example wireless system 200 that manages UWB OBW, according to some embodiments of the disclosure. System 200 may be any of the electronic devices (e.g., AP 110, station 120, mobile AP station 150) of system 100. System 200 includes central processing unit (CPU) 210, transceiver 220, communication infrastructure 230, memory 235, and antenna 250. Memory 235 may include random access memory (RAM) and/or cache, and may include control logic (e.g., computer instructions) and/or data. CPU 210 together with the instructions stored in memory 235 performs operations enabling the wireless system 200 to manage UWB OBWs. Transceiver 220 transmits and receives wireless communications signals while performing UWB OMB management functions according to some embodiments, and may be coupled to antenna 250. Communication infrastructure 230 may be a bus. Antenna 250 may include one or more antennas that may be the same or different types.

Figures 3A, 3B:
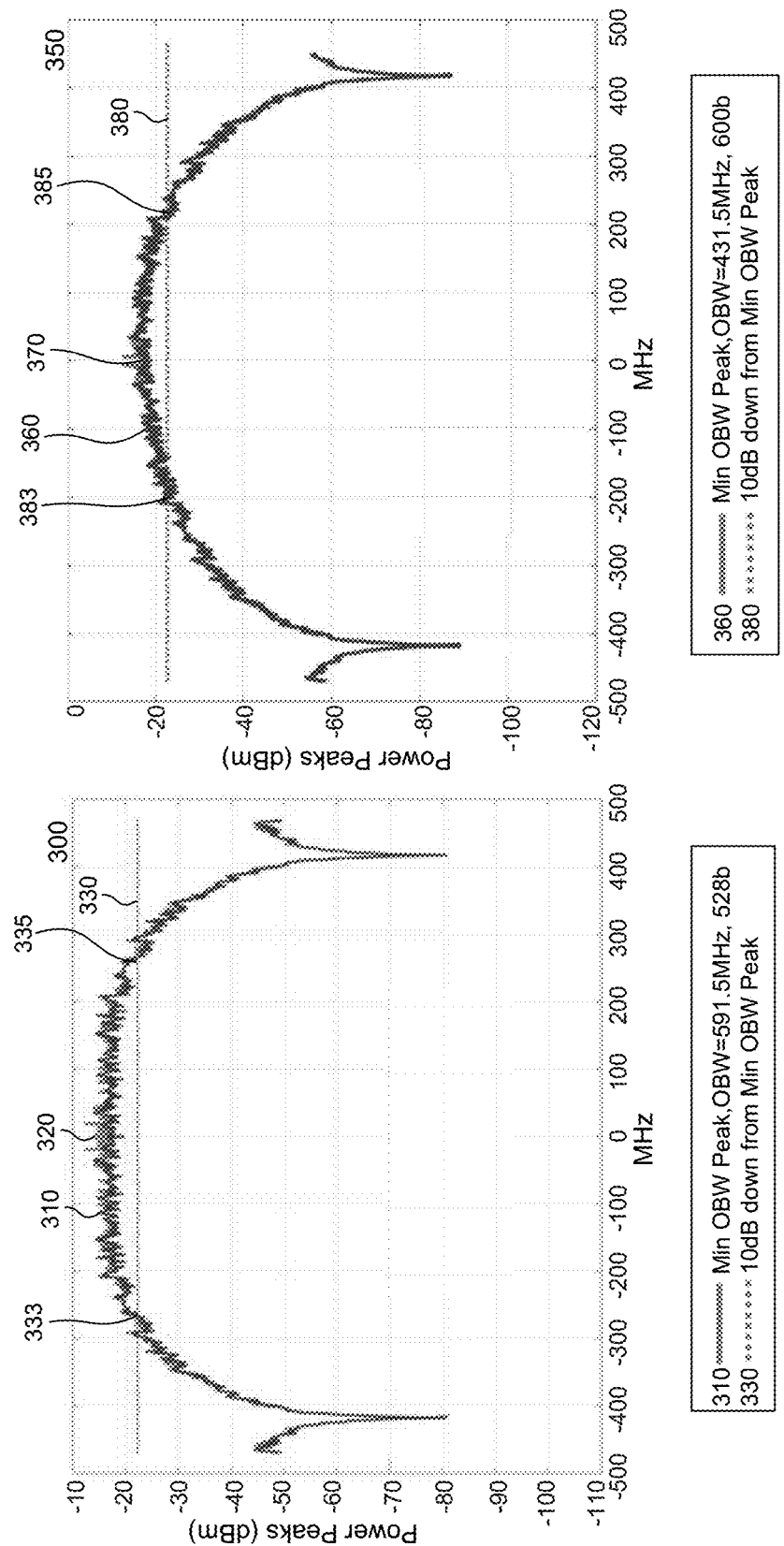
FIGS. 3A and 3B illustrate the effects of antenna roll-off and/or front end filtering, according to some embodiments of the disclosure.

FIGS. 3A and 3B illustrate the effects of antenna roll-off and/or front end filtering, according to some embodiments of the disclosure. Example 300 of FIG. 3A illustrates a UWB signal spectrum without an antenna response roll off, and example 350 of FIG. 3B illustrates the UWB signal spectrum with an antenna response roll off (e.g., after the UWB signal is transmitted via the antenna.) For example, the maximum peak power at DC frequency 320 of UWB signal 310 determines level 330 which is 10 dB down in power from the maximum peak power at DC frequency 320 of UWB signal 310. The OBW of UWB signal 310 is 591.5 MHz, and is shown as the intersection of UWB signal 310 power spectrum and level 330 between points 333 and 335, which satisfies the UWB standard (e.g., the OBW of UWB signal 310 is measured from point 333 to point 335, approximately −296 MHz to 296 MHz=591.5 MHz.)

Example 350 of FIG. 3B illustrates the effects that an antenna response roll off has on a UWB signal spectrum transmitted via the antenna. For example, the maximum peak power at DC frequency 370 of UWB signal 360 determines level 380 which is 10 dB down in power from the maximum peak power at DC frequency 370 of UWB signal 360. The OBW of UWB signal 360 is 431.5 MHz, and is shown as the intersection of UWB signal 360 power spectrum and level 380 between points 383 and 385 (e.g., the OBW of UWB signal 360 is measured from point 383 to point 385, approximately −216 MH to 216 MHz=431.5 MHz.) Thus, the antenna response roll off has reduced the OBW of UWB signal 310 from 591.5 MHz to UWB signal 360 at 431.5 MHz, which does not satisfy the UWB OBW standard.

If maximum peak power at DC frequency 320 in FIG. 3A had a frequency component (not shown) with a maximum peak power measurement at the DC frequency greater than that of maximum peak power at DC frequency 320, the corresponding level (also not shown) 10 dB down in power from that higher maximum peak power measurement would be higher than level 330. The corresponding UWB OBW measurement would be less than 591.5 MHz because the corresponding UWB OBW would be between points 333 and 335. This is described below with regards to FIG. 4 as a UWB Signal example. As described below, some embodiments reduce or avoid a DC component at the DC frequency to raise the UWB OBW measurement of a UWB signal to satisfy the UWB OBW standard. This is described below with regards to FIG. 4 as a UWB Signal with Altered Code Sequence example. Some embodiments introduce frequency components at selected frequencies to raise a UWB signal power spectrum at the selected frequencies to exceed a level that is 10 dB down from the maximum peak power measurement that satisfies the UWB OBW standard despite the effects of antenna roll off and/or front end filter frequency response roll off. This is described below with regards to FIG. 4 as a UWB Signal with TailBit Signal example. Some embodiments include a combination of reducing or avoiding a frequency component at or close to the DC frequency as well as introducing frequency components at selected frequencies to produce a UWB signal whose OBW measurement satisfies the UWB OBW standard despite the effects of antenna roll off and/or front end filter frequency response roll off. This is described below with regards to FIG. 4 as a UWB Signal with Altered Code Sequence and TailBit Signal example.

Figure 4:
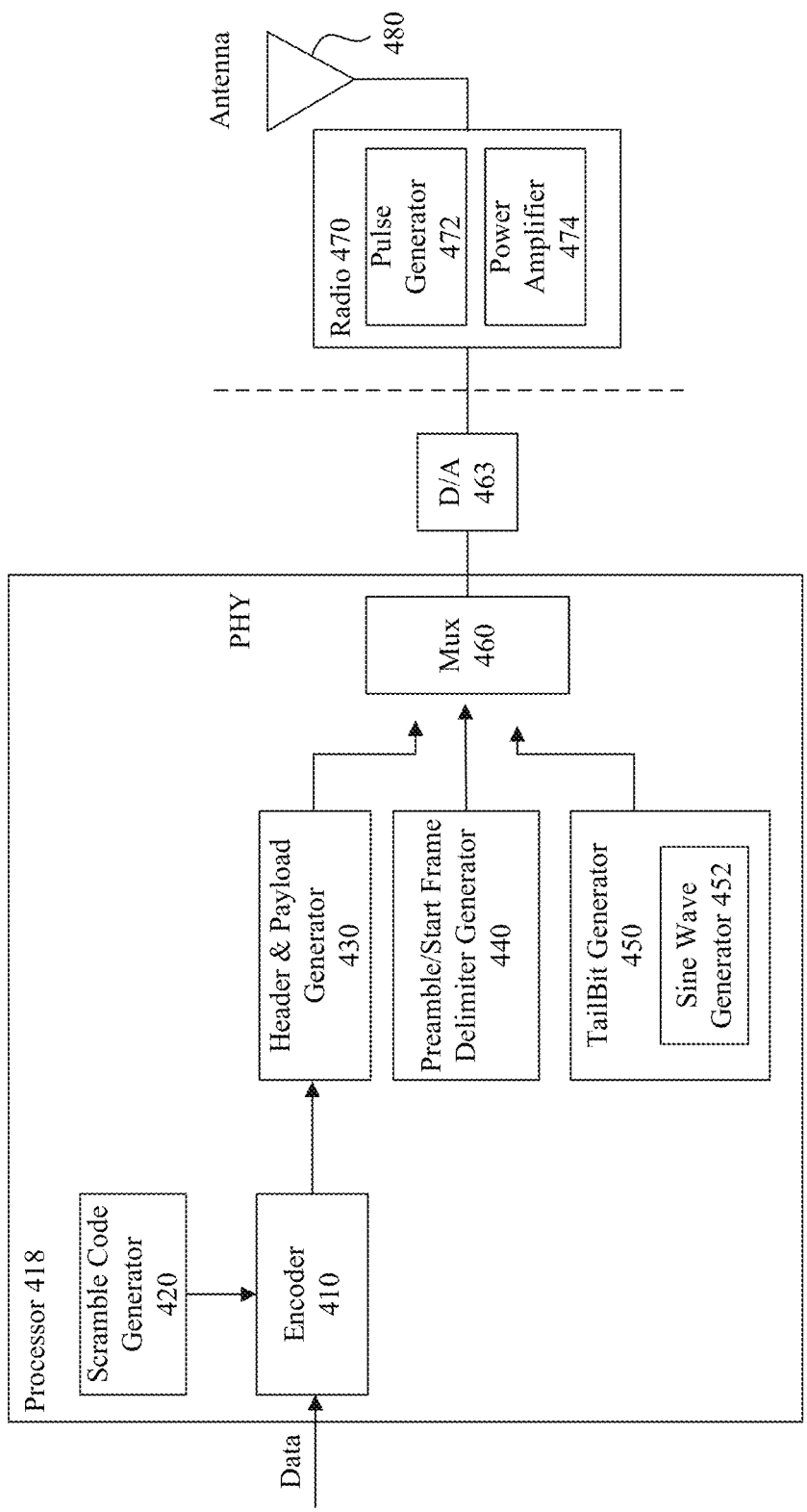
FIG. 4 illustrates a block diagram of an example UWB transmitter that manages UWB OBW, according to some embodiments of the disclosure.

FIG. 4 illustrates a block diagram 400 of an example UWB transmitter that manages UWB OBW, according to some embodiments of the disclosure. Some embodiments also include a UWB receiver (not shown) that performs analogous receiving functions described below to recover an original signal. As a convenience and not a limitation, FIG. 4 may be described with regard to elements of FIG. 2. In some embodiments, the functions of scrambler code generator 420, encoder 410, Header & Payload Generator 430, Preamble/Start Frame Delimiter (SFD) Generator 440, TailBit Generator 450, and Mux 460 may be performed by processor 418, which can be a part of transceiver 220 of FIG. 2. TailBit Generator 450 may include sine wave generator 452. The output of Mux 460 is transmitted to digital to analog (D/A) converter 463 that transmits the analog signal to radio 470. Radio 470 includes pulse generator 472 and power amplifier 474. Radio 470 may transmit UWB signals via Antenna 480 which may be implemented by communication Antenna 250 of FIG. 2. The following paragraphs describe the following examples: UWB Signal; UWB Signal with TailBit Signal; UWB Signal with Altered Code Sequence; and UWB Signal with Altered Code Sequence and TailBit Signal.

UWB Signal Example

In this example, the OBW of the UWB signal may not satisfy the UWB OBW standard. This example describes the effects of a frequency component at or close to the DC frequency on a UWB Signal's OBW. Encoder 410 receives an original signal (e.g., data) and modulates the original signal with a scramble code sequence received from scramble code generator 420 to produce a spread signal. The spread signal may include a DC frequency component that peaks close to, or at, the DC frequency that causes a reduction in the OBW measurement of the respective UWB signal spectrum. Header & Payload Generator 430 receives the spread signal and adds a header and payload to the spread signal. Preamble/SFD Generator 440 generates a preamble and the SFD that are multiplexed together with the output of Header & Payload Generator 430 by Mux 460 to produce a UWB packet as a baseband signal. Radio 470 includes Pulse Generator 472 and Power Amplifier 474, and modulates the UWB packet to a radio frequency (RF) and transmits the UWB signal via Antenna 480. The OBW of the UWB signal may not satisfy the UWB OBW standard due to a DC frequency component peak (e.g., a spike close to the DC frequency) which results in a smaller UWB as discussed above with respect to FIG. 3A. In addition, the antenna roll off frequency response also lowers the UWB OBW as discussed above with respect to FIG. 3B.

Figures 7A, 7B:
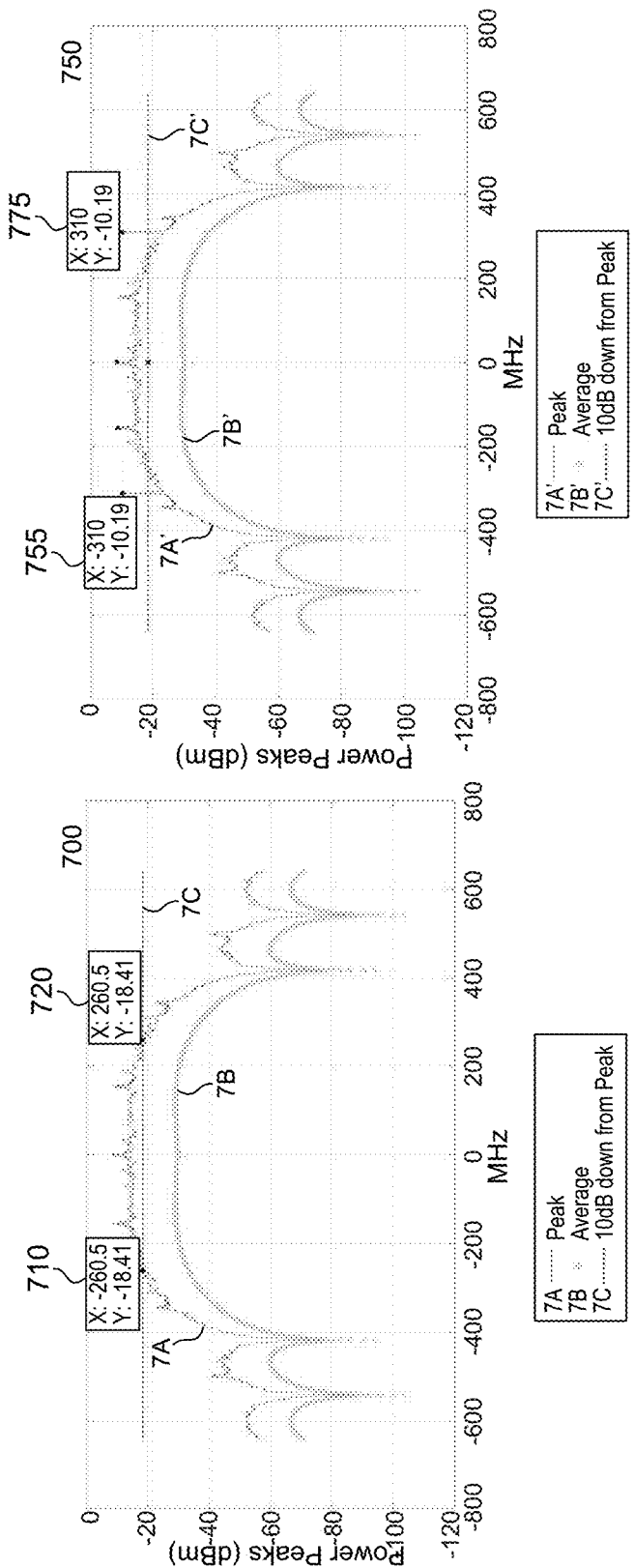
FIGS. 7A and 7B illustrate example spectrums of a UWB signal and a TailBit UWB signal, according to some embodiments of the disclosure.

FIG. 7A illustrates an example spectrum 700 of a UWB signal that shows peak power signal 7A of the UWB signal, the average power signal 7B, and level 7C that marks the 10 dB down in power from the maximum peak power of peak power signal 7A at the DC frequency. In this example, peak power signal 7A intersects with level 7C at points 710 and 720. According to the UWB OBW standard, the OBW of the UWB signal is 521 MHz (e.g., 260.5 MHz+260.5 MHz.) With the antenna frequency response roll off and/or front end filtering frequency response roll off, the OBW of the UWB signal may be reduced below the UWB OBW standard (e.g., 500 MHz.)

UWB Signal with TailBit Signal Example

Some embodiments include a UWB Signal with a TailBit signal that produces an TailBit UWB signal whose UWB OBW satisfies the UWB OBW standard. Some embodiments introduce frequency components at selected frequencies to raise a UWB signal power spectrum at the selected frequencies to exceed a level that is 10 dB down from the maximum peak power measurement that satisfies the UWB OBW standard despite the effects of antenna roll off and/or front end filter frequency response roll off. In this example, Encoder 410 receives an original signal (e.g., data) to be transmitted and modulates the original signal with a scramble code sequence received from scramble code generator 420 to produce a spread signal. The spread signal may include a DC frequency component that peaks close to the DC frequency that causes a reduction in the OBW of the respective UWB signal spectrum. Header & Payload Generator 430 receives the spread signal and adds a header and payload to the spread signal. Preamble/SFD Generator 440 generates a preamble and the SFD.

In some embodiments, TailBit Generator 450 produces a TailBit signal, a periodic signal at a selected frequency that is multiplexed together with the header and payload, and preamble and SFD, by Mux 460 to output a TailBit UWB packet as a baseband signal. In some embodiments the TailBit signal is appended at the beginning of a TailBit UWB packet, in the middle of the TailBit UWB packet, or at the tail or end of the TailBit UWB packet. The TailBit generator 450 can include a sine wave generator 452 so that the TailBit signal may be a sine wave at the selected frequency, where the selected frequency is offset from DC by some frequency amount to raise UWB power spectrum so that the UWB OBW standard is met. In some embodiments the selected frequency is greater than (or equal to) half the UWB OBW standard (e.g., greater than (500 MHz/2=250 MHz.) In some embodiments the TailBit signal may be a 1 μs periodic signal that is added to the spread signal.

Figure 5A:
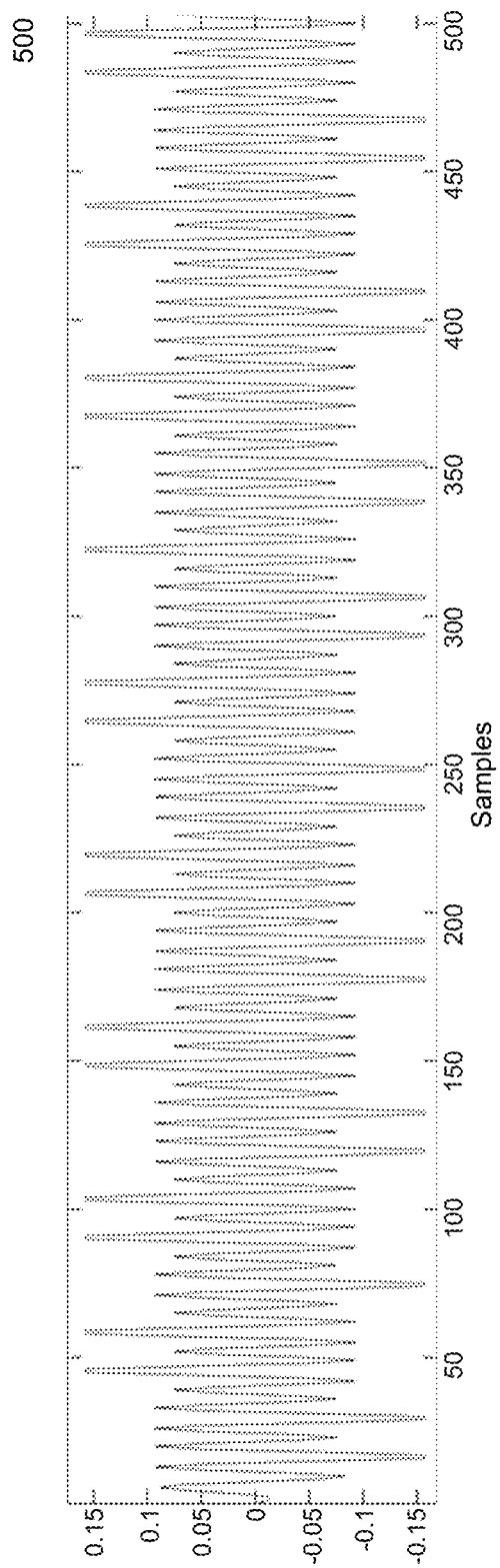
FIGS. 5A and 5B illustrate examples of a TailBit signal and TailBit chips, according to some embodiments of the disclosure.
Figure 5B:
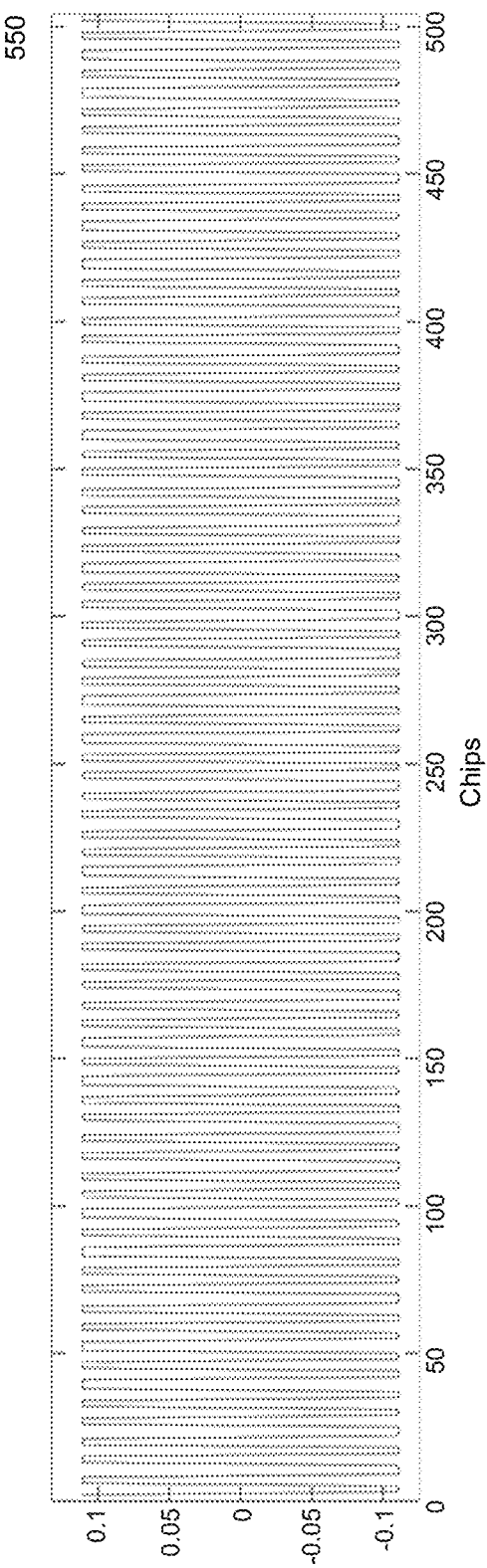
Figure 6:
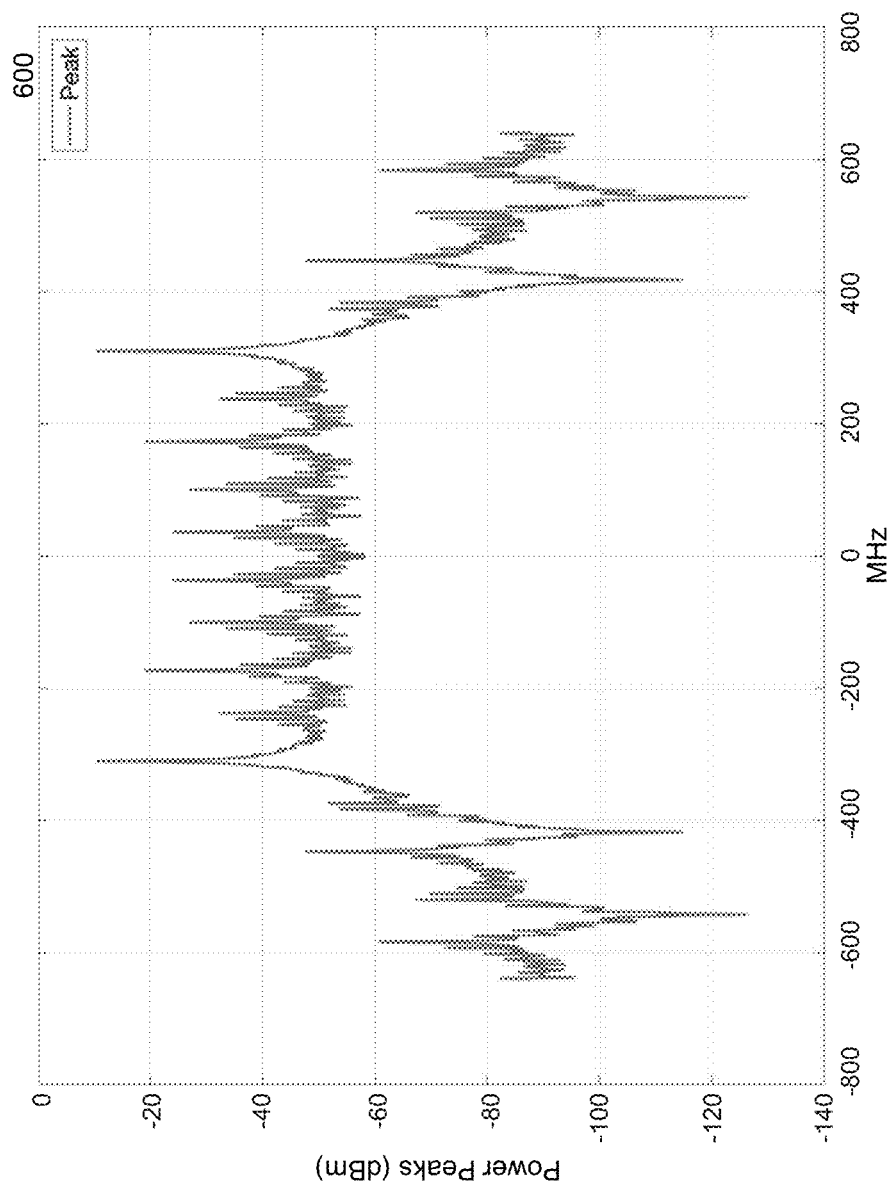
FIG. 6 illustrates an example spectrum of a TailBit signal, according to some embodiments of the disclosure.

FIGS. 5A and 5B illustrate examples of a TailBit signal 500 and TailBit chips, according to some embodiments of the disclosure. FIG. 6 illustrates an example spectrum 600 of a TailBit signal, according to some embodiments of the disclosure. As shown in spectrum 600, TailBit signal 500 produces spectral spikes at +/−310 MHz from the carrier frequency in the frequency domain.

Returning to example 400, Mux 460 multiplexes the output of the Header & Payload Generator 430, Preamble/SFD Generator 440, and the TailBit signal to produce a TailBit UWB packet as a baseband signal. Accordingly, the sine wave having the selected frequency is added to the original data signal by Mux 460. The TailBit UWB packet is transmitted to D/A Converter 463 where it is converted from a digital to an analog signal that is transmitted to radio 470. Radio 470 includes Pulse Generator 472 and Power Amplifier 474, and modulates the analog signal to an RF frequency and transmits the TailBit UWB signal via Antenna 480.

FIG. 7B illustrates an example spectrum 750 of a TailBit UWB signal that shows peak power signal 7A' of the TailBit UWB signal, the average power signal 7B', and level 7C' that marks the 10 dB down in power from the maximum peak power of peak power signal 7A' at the DC frequency. In this example, the TailBit signal is a periodic signal at a selected frequency of 310 MHz, such as a sine wave generated by sine wave generator 452. Accordingly, the power spectrum of the TailBit signal contributes frequency component 755 at −310 MHz and frequency component 775 at +310 MHz. In this example, peak signal 7A' intersects with level 7C' at the widest points, frequency components 755 and 775, so that the OBW of the UWB signal is 620 MHz (310 MHz+310 MHz.) Points 760, 770, and 780 are identified as points for reference. Even with the antenna frequency response roll off and/or front end filtering frequency response roll off, the OBW measurement of the TailBit UWB signal may still satisfy the UWB OBW standard (e.g., 500 MHz) due to the frequency components at −310 MHz and +310 MHz. In some embodiments, the selected frequency is chosen to be half that of a desired OBW measurement. For example, for the desired UWB OBW bandwidths: 600 MHz, 630 MHz, 650 MHz, corresponding selected frequencies of the periodic signal are 300 MHz, 315 MHz, and 325 MHz.

UWB Signal with Altered Code Sequence Example

Some embodiments include a UWB Signal with an altered code sequence that produces an altered UWB signal whose UWB OBW satisfies the UWB OBW standard. As described earlier, a UWB signal may include a frequency component that peaks at or close to the DC frequency, which raises the level that marks the 10 dB down from the maximum peak power at the DC frequency of the UWB signal. The raised level causes a reduction in the OBW measurement of the respective UWB signal power spectrum. In this example, some embodiments reduce or avoid the frequency component peak at or close to the DC frequency to raise the UWB OBW measurement of the UWB signal to satisfy the UWB OBW standard.

The frequency component peak at or close to the DC frequency can be caused by the scramble code sequence that is generated by scramble code generator 420, where the scramble code sequence includes a sequence of pulses of positive or negative polarity. When the number of pulses in a particular sequence have the same polarity so as to satisfy (e.g. exceed) a polarity ratio threshold, the modulation of the number of pulses with the original signal results in a UWB signal with a peak frequency component near the DC frequency, which results in a UWB signal power spectrum with a lower OBW measurement. Stated another way, an excess of positive pulses (or negative pulses) in any particular set of pulses will result in an undesired DC frequency peak in the UWB signal power spectrum, which negatively affects the OBW measurement.

Figure 9:
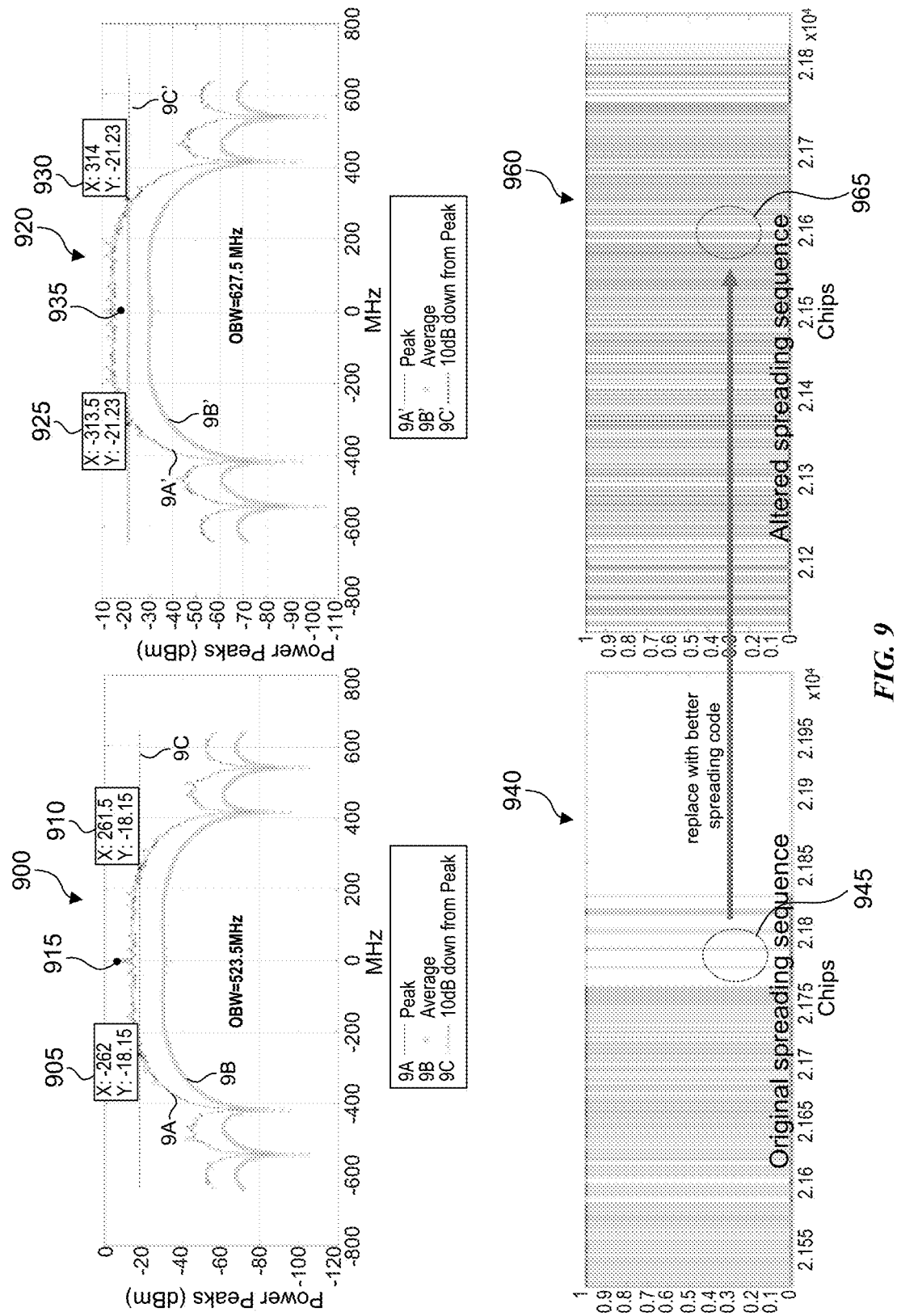
FIG. 9 illustrates an example of a UWB signal and an altered UWB signal, according to some embodiments of the disclosure.

FIG. 9 illustrates an example 900 of a UWB signal with an original spreading sequence as shown in example 940. The original spreading sequence shown at 945 includes for example, ten 1's and 54 0's that can generate a DC component peak close to the DC frequency. Example 900 includes peak power UWB signal 9A, average power UWB signal 9B, and level 9C that marks the level 10 dB down from maximum peak power at the DC frequency 915 of peak power signal 9A. As identified by points 905 and 910, the OBW is 523.5 MHz (e.g., 262 MHz+261.5 MHz.) In some embodiments, scramble code generator 420 may detect when a spreading code sequence may generate a frequency component peak (e.g., spike) close to the DC frequency and provide an altered code sequence that can reduce or eliminate the frequency component peak close to the DC frequency.

Figure 8:
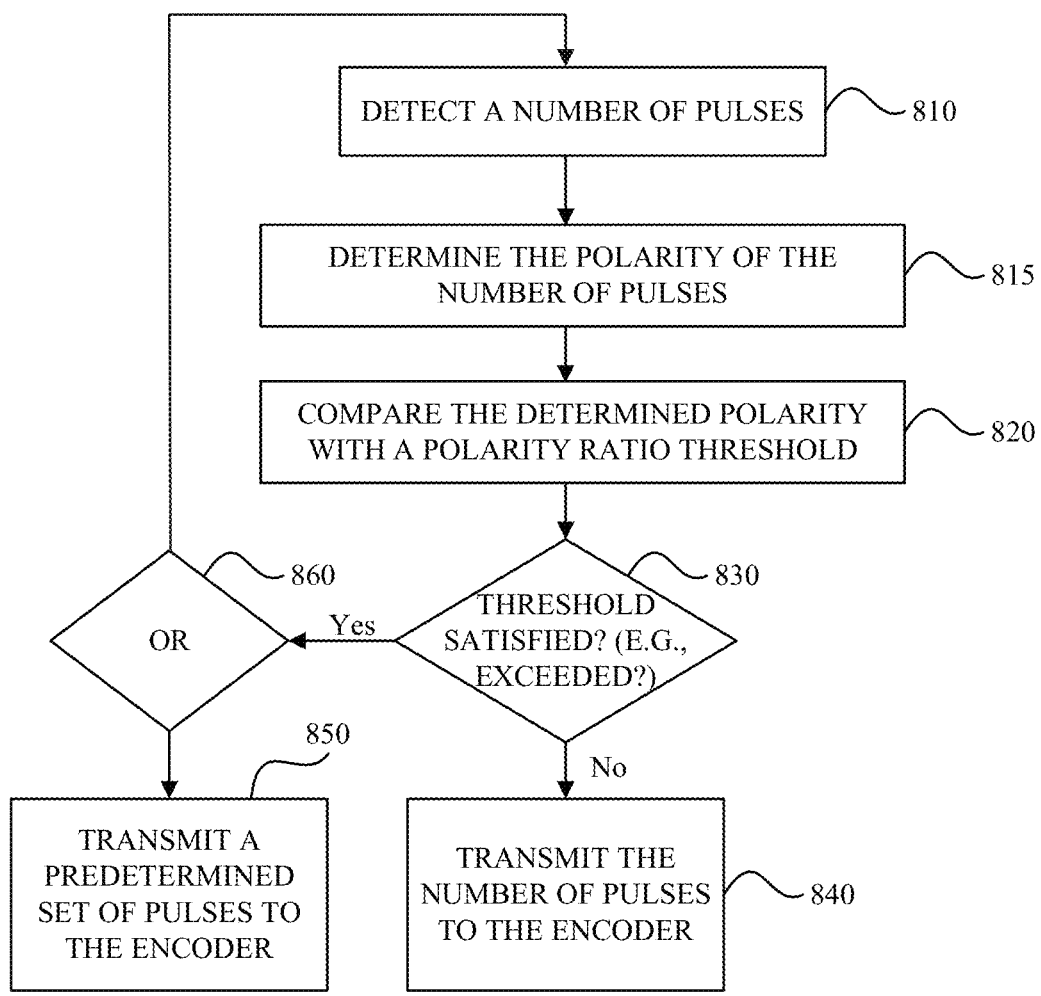
FIG. 8 illustrates an example method for determining an altered code sequence, according to some embodiments of the disclosure.

FIG. 8 illustrates an example method 800 for determining an altered code sequence, according to some embodiments of the disclosure. As an example, and not a limitation, method 800 may be performed by system 200 of FIG. 2. In some embodiments, scramble code generator 420 can perform method 800. For example, processor 418 may cause the scramble code generator 420 to perform method 800.

At 810, method 800 detects a number of pules of a spreading code sequence.

At 815, method 800 may determine the polarity of the number of pulses. For example, method 800 may sum the polarity of the number of pulses.

At 820, method 800 compares the determined polarity of the number of the pulses with a polarity ratio threshold. The polarity ratio threshold may be for example, a predetermined number (e.g., 44) consecutive pulses of a same polarity that can result in a frequency component peak close to the DC frequency. Lowering the polarity ratio threshold lowers the impact of the frequency component peak at or close to the UWB signal's DC frequency component and does not affect the OBW measurement as much as a larger polarity ratio threshold. Conversely, raising the polarity ratio threshold increases the impact of the frequency component peak close to the UWB signal's DC frequency component, and hence the impact on the OBW measurement.

At 830, method 800 determines whether the polarity ratio threshold is satisfied (e.g., the polarity of the number of pulses exceeds the polarity ratio threshold.) When the polarity ratio threshold is satisfied, method 800 proceeds to 860. When the polarity ratio threshold is not satisfied, method 800 proceeds to 840.

At 840, the number of pulses has an acceptable polarity and method 800 transmits the number of pulses to the encoder (e.g., encoder 410.)

Returning to 860, when the polarity ratio threshold is satisfied, the number of pulses has an unacceptable polarity and an altered code sequence is desired. In some embodiments, method 800 proceeds to 810 so that a new set of pulses can be generated. In some embodiments method 800 proceeds to 850.

At 850, method 800 transmits a predetermined set of pulses to the encoder (e.g., encoder 410) that are used as the altered code sequence. For example, the predetermined set of pulses can include a much lower polarity ratio.

UWB transmitter 400 is described below with an altered code sequence instead of the scramble code sequence of the previous case. Some embodiments include a UWB Signal with an altered code sequence. For example, scramble code generator 420 determines an altered code sequence that includes a number of pulses whose polarity does not satisfy (e.g., does not exceed) a polarity ratio threshold, and transmits the altered code sequence to Encoder 410. The altered code sequence may be pre-determined and stored in a memory (not shown). Encoder 410 modulates the original signal with the altered code sequence to produce an altered spread signal that has a reduced frequency component peak at or close to the DC frequency, or no frequency component peak at or close to the DC frequency. Thus, the UWB signal spectrum that corresponds to the altered spread signal may experience less or no reduction in the OBW measurement due to a frequency component peak at or close to the DC frequency. Header & Payload Generator 430 receives the altered spread signal and outputs a header and payload for an altered UWB packet. Preamble/SFD Generator 440 produces a preamble and SFD that are multiplexed together with the output of Header & Payload Generator 430 by Mux 460 to produce an altered UWB packet as a baseband signal. Pulse Generator and Power Amplifier 470 receive the altered UWB packet and transmit a UWB signal via antenna 480.

FIG. 9 illustrates an example 920 of an altered UWB signal with an altered code sequence as shown in example 960. The altered code sequence at 965 includes for example, a number of pulses whose polarity is less than the polarity ratio threshold. As shown, altered code sequence at 965 has less consecutive pulses with a common polarity than the original spreading sequence at 945. Thus, the number of pulses in an altered code sequence can reduce or eliminate (e.g., if the polarities of the number of pulses equals zero) a frequency component peak at or close to the DC frequency. Example 920 includes peak power UWB signal 9A', average power UWB signal 9B', and level 9C' that marks the level 10 dB down in power from maximum peak power at the DC frequency 935 of peak power signal 9A'. As identified by points 925 and 930, the OBW is 627.5 MHz (e.g., 313.5 MHz+314 MHz.)

UWB Signal with Altered Code Sequence and TailBit Signal Example

Some embodiments include a UWB Signal with an altered code sequence and a TailBit signal that produces an altered-TailBit UWB signal having a UWB OBW that satisfies the UWB OBW standard. For example, scramble code generator 420 determines an altered code sequence (see FIG. 8 and FIG. 9) that includes a number of pulses whose polarity does not satisfy (e.g., does not exceed) a polarity ratio threshold, and transmits the altered code sequence to Encoder 410. Encoder 410 modulates the original signal with the altered code sequence to produce an altered spread signal that has a reduced frequency component peak at or close to the DC frequency, or no frequency component peak at or close to the DC frequency. Thus, the UWB signal spectrums that correspond to the altered spread signal may experience less or no reduction in the OBW measurement due to a frequency component peak at close to DC frequency. Header & Payload Generator 430 receives the altered spread signal and outputs a header and payload for a packet. Preamble/SFD Generator 440 produces a preamble and SFD, and TailBit Generator 450 produces a TailBit signal (see FIGS. 5A, 5B, 6, and 7B), that are multiplexed together with the header and payload, by Mux 460 to output an altered-TailBit UWB packet as a baseband signal. Pulse Generator and Power Amplifier 470 receive the altered-TailBit UWB packet and transmits an altered-TailBit UWB signal via antenna 480.

Figure 10:
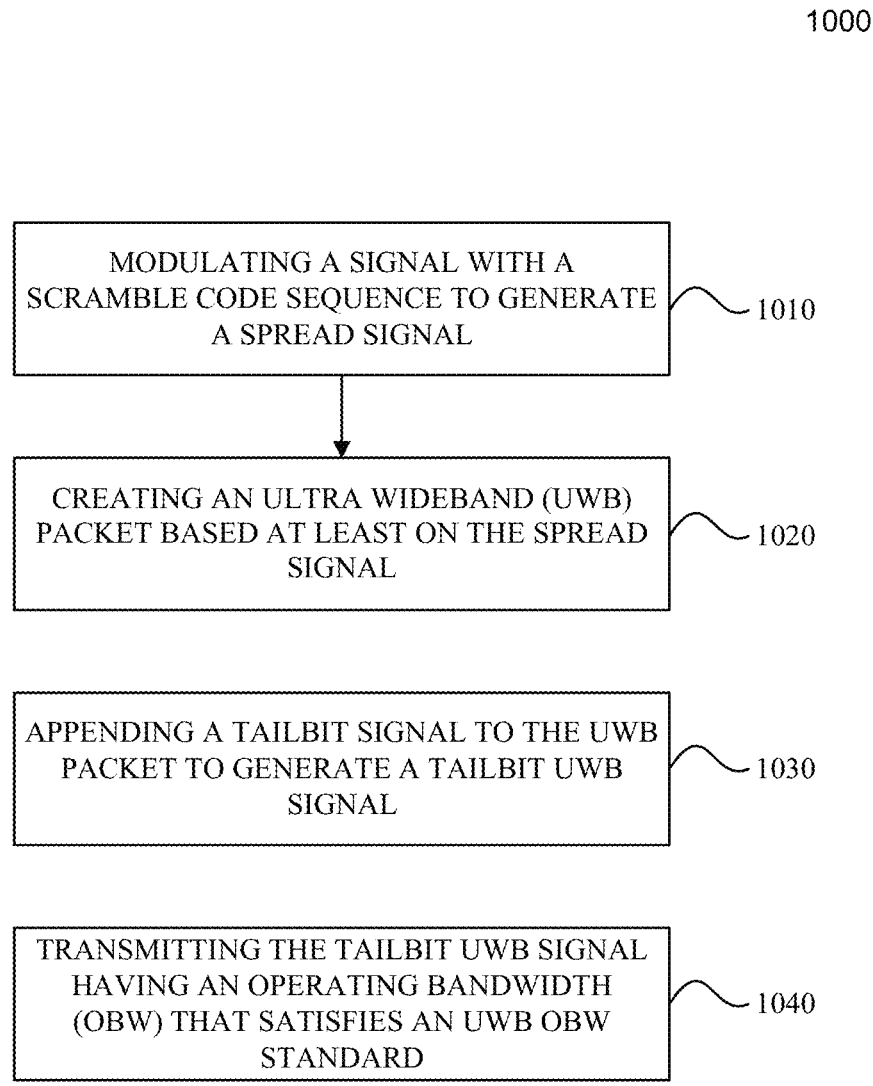
FIG. 10 illustrates an example method for managing a UWB OBW, according to some embodiments of the disclosure.

FIG. 10 illustrates an example method 1000 for managing a UWB OBW, according to some embodiments of the disclosure. As an example, and not a limitation, method 1000 may be performed by system 200 of FIG. 2 and/or processor 418 of UWB transmitter 400.

At 1010, method 1010 includes modulating a signal with a scramble code sequence to generate a spread signal. For example, encoder 410 may receive data and modulate the data with a scramble code sequence received from scramble code generator 420 to generate the spread signal. In some embodiments, scramble code generator 420 (or processor 418 performing scramble code generator 420 functions) may determine an altered code sequence as described in method 800 above.

At 1020, method 1000 includes creating or generating a UWB packet based at least on the spread signal. For example, encoder 410 generates a UWB packet based on the spread signal generated in 1010.

At 1030, method 1000 includes appending a TailBit signal to the UWB packet to generate a TailBit UWB signal. For example, the TailBit signal can be a periodic signal at a selected frequency greater than (or equal to) half of a UWB OBW standard (e.g., greater than 250 MHz). In some embodiments, the TailBit signal may be a sine wave that is generated by sine wave generator 452 of FIG. 4. Accordingly, the TailBit UWB signal has a TailBit UWB power spectrum that includes a frequency component at the selected frequency that is above a level that is 10 dB down from a maximum peak power measurement at a DC frequency of the TailBit UWB power spectrum. The TailBit signal may be multiplexed by Mux 460 to the UWB packet that includes a preamble, SFD, a header, and a payload.

At 1040, method 1000 includes transmitting, the TailBit UWB signal having an OBW that satisfies the UWB OBW standard. For example, the resulting TailBit UWB signal is transmitted to digital to analog (D/A) converter 463 that converts the TailBit UWB signal to an analog signal that is received by radio 470, and transmitted via Antenna 480.

Figure 11:
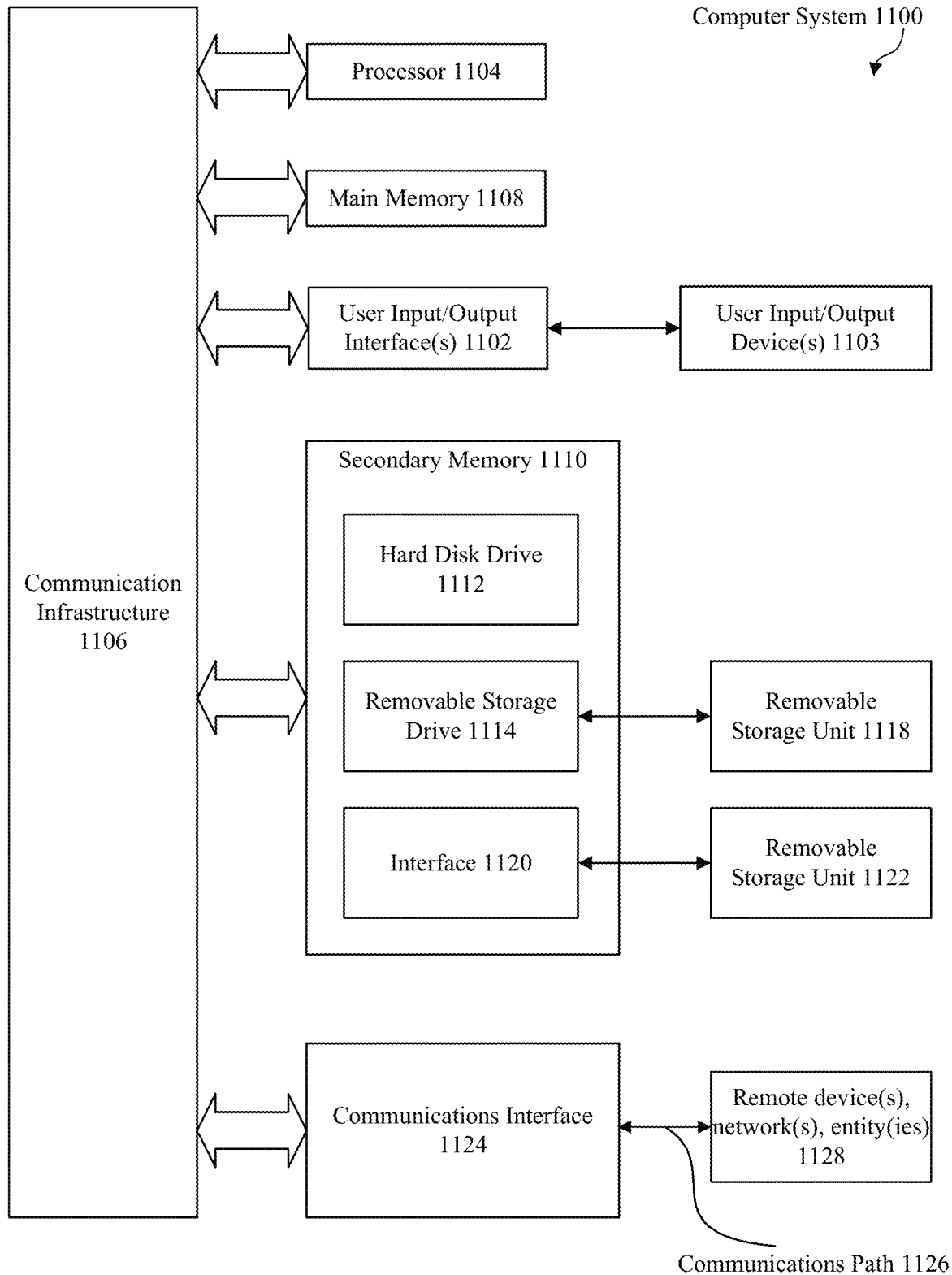
FIG. 11 is an example computer system for implementing some embodiments or portion(s) thereof.

Various embodiments can be implemented, for example, using one or more computer systems, such as computer system 1100 shown in FIG. 11. Computer system 1100 can be any well-known computer capable of performing the functions described herein such as devices 110, 120, 150, or UWB devices as described with respect to FIG. 1. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
   a radio configured to transmit ultra wideband (UWB) wireless communications to a second electronic device; and
   a processor, coupled to the radio, configured to:
      modulate a signal with an altered code sequence to generate an altered spread signal, wherein the altered code sequence satisfies a polarity ratio threshold;
      generate an altered UWB packet based at least on the altered spread signal;
      append a TailBit signal to the altered UWB packet to generate an altered-TailBit UWB signal, wherein the TailBit signal includes a periodic signal at a selected frequency greater than or equal to half of a UWB operating bandwidth (OBW) standard; and
      transmit, via the radio, the altered-TailBit UWB signal having a OBW that satisfies the UWB OBW standard.

2. The electronic device of claim 1, wherein a power spectrum of the altered-TailBit UWB signal includes frequency components at the selected frequency that are above a level that is 10 dB down from a maximum peak power at a DC frequency of the altered-TailBit UWB power spectrum.

3. The electronic device of claim 1, wherein the periodic signal is a sine wave at the selected frequency.

4. The electronic device of claim 3, wherein the selected frequency is 310 MHz, and a power spectrum of the altered-TailBit UWB signal comprises frequency components at −310 MHz and at 310 MHz that are above a level that is 10 dB down from a maximum peak power at a DC frequency of the power spectrum of the altered-TailBit UWB signal.

5. The electronic device of claim 1, wherein the TailBit signal is appended to: a beginning of the altered UWB packet, a middle of the altered UWB packet, or an end of the altered UWB packet.

6. The electronic device of claim 1, wherein the processor is further configured to:
   detect a number of pulses;
   determine a polarity of the number of pulses; and
   compare the determined polarity with the polarity ratio threshold.

7. The electronic device of claim 6, wherein the comparison satisfies the polarity ratio threshold, and wherein the processor is further configured to use a predetermined set of pulses as the altered code sequence.

8. The electronic device of claim 6, wherein the comparison satisfies the polarity ratio threshold, and wherein the processor is further configured to:
   detect a second number of pulses;
   determine that a second polarity of the second number of pulses does not satisfy the polarity ratio threshold; and
   use the second number of pulses as the altered code sequence.

9. A non-transitory computer-readable medium storing instructions that, when executed by a processor of a first electronic device, cause the processor to perform operations, the operations comprising:
   modulating a signal with an altered code sequence to generate an altered spread signal, wherein the altered code sequence satisfies a polarity ratio threshold;
   generating an altered Ultra Wideband (UWB) packet based at least on the altered spread signal;
   appending a TailBit signal to the altered UWB packet to produce an altered-TailBit UWB signal having a power spectrum with frequency components at a selected frequency that are above a level that is 10 dB down from a maximum peak power at a DC frequency of the altered-TailBit UWB signal; and
   transmitting the altered-TailBit UWB signal having an operational bandwidth (OBW) that satisfies a UWB OBW standard.

10. The non-transitory computer-readable medium of claim 9, wherein the TailBit signal is a periodic signal at the selected frequency that is greater than or equal to half of the UWB OBW standard.

11. The non-transitory computer-readable medium of claim 9, wherein the TailBit signal is a sine wave at the selected frequency.

12. The non-transitory computer-readable medium of claim 11, wherein the selected frequency is 310 MHz, and the frequency components occur at −310 MHz and at 310 MHz and are above the level that is 10 dB down from the maximum peak power at the DC frequency of the power spectrum of the altered-TailBit UWB signal.

13. The non-transitory computer-readable medium of claim 9, wherein the TailBit signal is appended to: a beginning of the altered UWB packet, a middle of the altered UWB packet, or an end of the altered UWB packet.

14. The non-transitory computer-readable medium of claim 9, wherein the operations further comprise:
   detecting a number of pulses;
   determining a polarity of the number of pulses; and
   comparing the determined polarity with the polarity ratio threshold.

15. The non-transitory computer-readable medium of claim 14, wherein the comparison satisfies the polarity ratio threshold, and wherein the operations further comprise using a predetermined set of pulses as the altered code sequence.

16. The non-transitory computer-readable medium of claim 14, wherein the comparison satisfies the polarity ratio threshold, and wherein the operations further comprise:
   detecting a second number of pulses;
   determining that a second polarity of the second number of pulses does not satisfy the polarity ratio threshold; and
   using the second number of pulses as the altered code sequence.

17. A method, comprising:
   modulating a signal with a scramble code sequence to generate a spread signal;
   creating an Ultra Wideband (UWB) packet based at least on the spread signal;
   appending a TailBit signal to the UWB packet to generate a TailBit UWB signal, wherein the TailBit signal is a periodic signal at a selected frequency greater than or equal to half of a UWB operating bandwidth (OBW) standard, wherein the TailBit UWB signal has a TailBit UWB power spectrum that includes a frequency component at the selected frequency that is above a level that is 10 dB down from a maximum peak power at a DC frequency of the TailBit UWB power spectrum; and
   transmitting the TailBit UWB signal having an OBW that satisfies the UWB OBW standard.

18. The method of claim 17, wherein the TailBit signal is a sine wave at the selected frequency.

19. The method of claim 18, wherein the selected frequency is 310 MHz, and a power spectrum of the TailBit UWB signal comprises frequency components at −310 MHz and at 310 MHz that are above the level that is 10 dB down from the maximum peak power at the DC frequency of the power spectrum of the TailBit UWB signal.

20. The method of claim 17, wherein the TailBit signal is appended to: a beginning of the UWB packet, a middle of the UWB packet, or an end of the UWB packet.

* * * * *